(12) United States Patent
Zhou et al.

(10) Patent No.: US 10,698,926 B2
(45) Date of Patent: Jun. 30, 2020

(54) CLUSTERING AND LABELING STREAMED DATA

(71) Applicant: Microsoft Technology Licesning, LLC, Redmond, WA (US)

(72) Inventors: Shandan Zhou, Redmond, WA (US); Karthikeyan Subramanian, Redmond, WA (US); Murtaza Muidul Huda Chowdhury, Sammamish, WA (US); Gowtham Natarajan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 400 days.

(21) Appl. No.: 15/493,036

(22) Filed: Apr. 20, 2017

(65) Prior Publication Data

US 2018/0307740 A1    Oct. 25, 2018

(51) Int. Cl.
*G06F 16/28* (2019.01)
*G06F 11/07* (2006.01)
*G06F 16/2455* (2019.01)

(52) U.S. Cl.
CPC ........ *G06F 16/285* (2019.01); *G06F 11/0778* (2013.01); *G06F 11/0787* (2013.01); *G06F 16/24568* (2019.01)

(58) Field of Classification Search
CPC ............. G06F 16/285; G06F 16/24568; G06F 11/0787; G06F 11/0778
USPC ...................................................... 707/738
See application file for complete search history.

(56) References Cited

U.S. PATENT DOCUMENTS

| 8,386,466 | B2 * | 2/2013 | Park ................... G06F 16/2358 707/713 |
| 8,386,854 | B2 | 2/2013 | Fernandess et al. |
| 9,262,519 | B1 | 2/2016 | Saurabh et al. |
| 2010/0088354 | A1 | 4/2010 | Wu et al. |
| 2011/0314339 | A1 | 12/2011 | Daily et al. |

(Continued)

OTHER PUBLICATIONS

Gunasekaran, Raghul, et al., "Real-Time System Log Monitoring / Analytics Framework", Cray User Group Conference (CUG 2011), Fairbanks, AL, May 23-26, 2011, 9 pages.*

(Continued)

*Primary Examiner* — Robert Stevens
(74) *Attorney, Agent, or Firm* — Ray Quinney & Nebeker, P.C.; Thomas M. Hardman; Brandon K. Roper

(57) ABSTRACT

Aspects extend to methods, systems, and computer program products for clustering streamed or batch data. Aspects of the invention include dynamic clustering and labeling of streamed data and/or batch data, including failures and error logs (user, platform, etc.), latency logs, warning logs, information logs, Virtual Machine (VM) creation data logs, template logs, etc., for use in analysis (e.g., error log analysis). A clustering system can learn from previously identified patterns and use that information to group newer information dynamically as it gets generated. The clustering system can leverage streamed data and/or batch data domain knowledge for preprocessing. In one aspect, a clustering system uses a similarity measure. Based on (e.g., users' configuration of) a similarity threshold, the cluster system (e.g., automatically) assigns/clusters streamed data and/or batch data into groups.

18 Claims, 4 Drawing Sheets

(56) References Cited

U.S. PATENT DOCUMENTS

| | | | |
|---|---|---|---|
| 2014/0164376 A1* | 6/2014 | Yang | G06F 16/355 |
| | | | 707/737 |
| 2015/0301996 A1* | 10/2015 | Hinterbichler | G06F 11/3656 |
| | | | 715/230 |
| 2015/0347264 A1 | 12/2015 | Mohammed et al. | |
| 2016/0092552 A1* | 3/2016 | Morfonios | G06F 11/14 |
| | | | 707/737 |
| 2016/0350173 A1* | 12/2016 | Ahad | G06F 11/3495 |
| 2017/0187734 A1* | 6/2017 | Lee | G06F 11/1446 |
| 2017/0279840 A1* | 9/2017 | Zhang | H04L 63/1425 |
| 2018/0129579 A1* | 5/2018 | Debnath | G06N 20/00 |
| 2018/0144041 A1* | 5/2018 | Chen | G06F 9/466 |

OTHER PUBLICATIONS

Vaarandi, Risto, "A Data Clustering Algorithm for Mining Patterns From Event Logs", IPOM 2003, Kansas City, MO, Oct. 3, 2003, pp. 119-126.*

Vaarandi, Risto, et al., "LogCluster—A Data Clustering and Pattern Mining Algorithm for Event Logs", CNSM 2015, Barcelona, Spain, Nov. 9-13, 2015, 7 pages.*

Xu, Wei, et al., "A Flexible Architecture for Statistical Learning and Data Mining from System Log Streams", Temporal Data Mining: Algorithms, Theory and Applications, Brighton, UK, © 2004, 12 pages.*

Joshi, Basanta, et al., "Intelligent Clustering Scheme for Log Data Streams", CICLing 2014, Part II, LNCS 8404, Springer-Verlag, Berlin, Germany, © 2014, pp. 454-465.*

Gunasekaran, Raghul, et al., "Correlating Log Messages for System Diagnostics", Cray User Group Conference (CUG 2010), Edinburgh, Scotland, May 24-27, 2010, 8 pages.*

Microsoft Computer Dictionary, 5th Edition, Microsoft Press, Redmond, WA, © 2002, pp. 499 and 554.*

Blundoa, et al., "EsPRESSo: Efficient Privacy-Preserving Evaluation of Sample Set Similarity", In Journal of Computer Security, vol. 22, Issue 3, Sep. 20, 2013, pp. 1-18.

"Oracle Cloud: Using Log Analytics Cloud Service", https://docs.oracle.com/en/cloud/paas/management-cloud/logcs/using-oracle-log-analytics-cloud-service.pdf, Published on: Dec. 2016, 90 pages.

Makanju, et al., "Clustering Event Logs Using Iterative Partitioning", In Proceedings of the 15th ACM SIGKDD International Conference on Knowledge Discovery and Data Mining, Jun. 28, 2009, 9 pages.

Tang, et al., "LogTree: A Framework for Generating System Events from Raw Textual Logs", In Proceedings of IEEE 10th International Conference on Data Mining, Dec. 13, 2010, 10 pages.

Lin, et al., "Error Log Analysis: Statistical Modeling and Heuristic Trend Analysis", In Journal of IEEE Transactions on Reliability, vol. 39, Issue 4, Oct. 1990, pp. 419-432.

* cited by examiner

Equation 301

$$\Delta ThresholdOfFrequentWord = MIN_{i=2}^{s} B_i - B_{i-1}$$

CLUSTERING AND LABELING STREAMED DATA

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. For example, distributed applications can have components at a number of different computer systems.

In many computing environments, diagnostic information is indicated in an error log or other type of log. Information in a log can be used to identify and understand the cause of system failures or software bugs. For example, an error log can be streamed from a device to provide information about errors occurring at the device.

BRIEF SUMMARY

Examples extend to methods, systems, and computer program products for clustering and labeling streamed data. Streamed data is received from a device over a network connection. Relevant features within the streamed data are identified. For any previously formed log pattern clusters, a similarity between the relevant features and each of the previously formed log pattern clusters is determined. The streamed log data is assigned to a log pattern cluster based on the determined similarities.

In one aspect, for each of a plurality of previously formed log pattern clusters, a similarity between the relevant features and the previously formed log pattern cluster is calculated. A similarity threshold is accessed. It is determined if the calculated similarity satisfies the similarity threshold. From among any previously formed log pattern clusters having calculated similarities satisfying the similarity threshold, a previously formed log pattern cluster having the highest calculated similarity to the relevant features is selected. The streamed log data is assigned to the previously formed log pattern cluster having the highest calculated similarity to the relevant features. A label for the previously formed log pattern cluster can be altered based on words contained in the relevant features.

In another aspect, for each of a plurality of previously formed log pattern clusters, a similarity between the relevant features and the previously formed log pattern cluster is calculated. It is determined that the calculated similarity does not satisfy the similarity threshold for any of the previously formed log pattern clusters. A new log pattern cluster is created based on the relevant features. The streamed log data is assigned to the new log pattern cluster. A label for the new log pattern cluster is constructed by summarizing words contained in the relevant features in accordance with a label length.

This summary is provided to introduce a selection of concepts in a simplified form that are further described below in the Detailed Description. This Summary is not intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1:
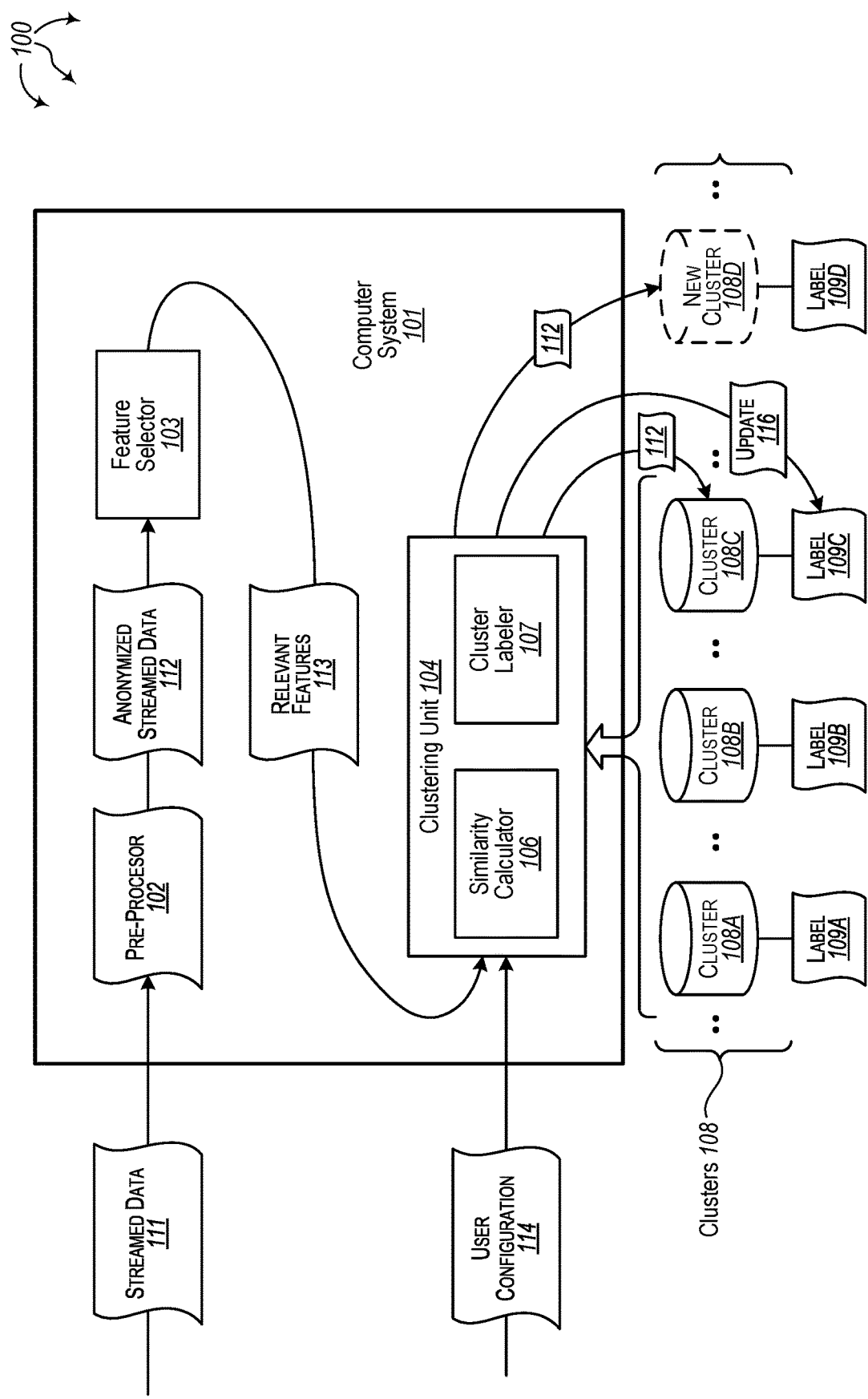
FIG. 1 illustrates an example computer architecture that facilitates clustering streamed data

Examples extend to methods, systems, and computer program products for clustering and labeling streamed data. Streamed data is received from a device over a network connection. Relevant features within the streamed data are identified. For any previously formed log pattern clusters, a similarity between the relevant features and each of the previously formed log pattern clusters is determined. The streamed log data is assigned to a log pattern cluster based on the determined similarities.

In one aspect, for each of a plurality of previously formed log pattern clusters, a similarity between the relevant features and the previously formed log pattern cluster is calculated. A similarity threshold is accessed. It is determined if the calculated similarity satisfies the similarity threshold. From among any previously formed log pattern clusters having calculated similarities satisfying the similarity threshold, a previously formed log pattern cluster having the highest calculated similarity to the relevant features is selected. The streamed log data is assigned to the previously formed log pattern cluster having the highest calculated similarity to the relevant features. A label for the previously formed log pattern cluster can be altered based on words contained in the relevant features.

In another aspect, for each of a plurality of previously formed log pattern clusters, a similarity between the relevant features and the previously formed log pattern cluster is calculated. It is determined that the calculated similarity does not satisfy the similarity threshold for any of the previously formed log pattern clusters. A new log pattern cluster is created based on the relevant features. The streamed log data is assigned to the new log pattern cluster. A label for the new log pattern cluster is constructed by summarizing words contained in the relevant features in accordance with a label length.

Implementations may comprise or utilize a special purpose or general-purpose computer including computer hardware, such as, for example, one or more computer and/or hardware processors (including Central Processing Units (CPUs) and/or Graphical Processing Units (GPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: streamed data, logs, anonymized streamed data, anonymized logs, batch data, relevant features, user configuration, similarity thresholds, cluster labels, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, streamed data, logs, anonymized streamed data, anonymized logs, batch data, relevant features, user configuration, similarity thresholds, cluster labels, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed. Aspects of the invention can be implemented across a wide variety of cloud computing environments and models.

Aspects of the invention include dynamic clustering and labeling of streamed data and/or batch data, including failures and error logs (user, platform, etc.), latency logs, warning logs, information logs, Virtual Machine (VM) creation data logs, template logs, etc., for use in analysis (e.g., error log analysis). A clustering system can learn from previously identified patterns and use that information to group newer information dynamically as it gets generated. The clustering system can leverage streamed data and/or batch data domain knowledge for preprocessing. In one aspect, a clustering system uses a measure based on the Jaccard similarity index to calculate the distance between streamed data or batch data (e.g., between error logs). Based on (e.g., users' configuration of) a similarity threshold, the cluster system (e.g., automatically) assigns/clusters streamed data and/or batch data into groups. Euclidean distances, cosine distances, or other distances can also be used to measure similarity.

Inside each group, the clustering system then applies summarization to extract a label for the group to de-identify (i.e. anonymize) individual customer/request related information for protecting. Thus, for example, the clustering system can (e.g., automatically) summarize detailed error logs by removing individual customer or request related details. Error log patterns can then be effectively and safely exposed to market place publishers so that they can understand the issue and take actions based on the summarized data.

In one aspect, a cluster system assigns error logs into log cluster patterns. As such, a clustering system can dynamically cluster logs based on information similarity and extract patterns. Thus, engineers can effectively understand and identify the root cause for the information and error logs and efficiently improve customer experience on various platforms. For error log data, a label can be used to summarize the root cause of errors contained in a cluster.

On some platforms, customers can promote their template/Virtual Machine (VM) images in a marketplace, which can be sold to thousands of customers. These third party applications and services can introduce bugs into a platform and/or cloud deployment. Aspects of the invention can be used to assist in identifying these and other types of bugs introduced into a platform and/or cloud deployment.

Accordingly, aspects of the invention can be used to detect large scale cloud system's error logs pattern and cluster error logs into the corresponding root cause. Aspects of the invention can also be used to summarize error clusters and automatically generate cluster labels.

In one aspect, a data preprocessing unit leverages domain knowledge of streamed data and/or batch data (e.g., error log) details to remove customer and request related identification information. A feature selection unit filters out high frequency and/or shorter words from the streamed data and/or batch data using statistical analysis to identify relevant features (e.g., errors). The relevant features are passed to a clustering unit. The clustering unit receives the relevant features. The clustering unit also accesses information for existing detected clusters and labels from a database.

For each relevant feature, the clustering unit calculates similarity scores for the relevant features to each of the existing detected clusters. If the highest similarity score is at least equal to a defined similarity threshold, the clustering unit assigns the streamed data to the cluster with highest similarity score. Otherwise, if the highest similarity score is less than the defined similarity threshold, the clustering unit creates a new cluster and assigns the streamed data to the new cluster.

A clustering label unit processes clusters to update existing cluster labels for existing detected clusters and extract new labels for new clusters. Label lengths can be updated and extracted elastically per customers' configuration. Labels can be stored in a labels database.

FIG. 1 illustrates an example computer architecture 100 that facilitates clustering streamed data. Referring to FIG. 1, computer architecture 100 includes computer system 101 and clusters 108. Computer system 101 and clusters 108 can be connected to (or be part of) a network, such as, for example, a system bus, a Local Area Network ("LAN"), a Wide Area Network ("WAN"), and even the Internet. Accordingly, computer system 101 and clusters 108 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Computer system 101 further includes pre-processor 102, feature selector 103 and clustering unit 104. Clustering unit 104 further includes similarity calculator 106 and cluster labeler 107. Pre-processor 102 is configured to anonymize streamed data (e.g., error logs) by de-identifying individual customer and request related information from streamed data. Streamed data can be anonymized by adopting a text matching mechanism. Based on domain knowledge, Global Unique Identifiers (GUIDs) can be used as unique identifiers for computer software and stored in corresponding logs. Pre-processor 102 extracts and removes GUIDs according to a text pattern for GUIDs.

Feature selector 103 is configured to tokenize streamed data (e.g., error logs) into relevant features. Relevant features can include words, phrases, etc. To tokenize streamed data, feature selector 103 can summarize the frequency of each word in the streamed data. Streamed data word frequency can be categorized into a plurality of categories (e.g., buckets). In one aspect, streamed data word frequency is categorized across five buckets. Words that occur 3 times or less in streamed data (e.g., frequency<=3) are categorized into a first bucket. Words that occur 4 times in the streamed data (frequency=4) are categorized into a second bucket. Words that occur 5 times in the streamed data (frequency==5) are categorized into a third bucket. Words that occur 6 times in the streamed data (frequency==6) are categorized into a fourth bucket. Words that occur 7 or more times (frequency>=7) are categorized into a fifth bucket.

Based on the word frequency categorization, feature selector 103 can then calculate the number of unique words that go into each bucket. An adopted rate of change can be used to decide the threshold for frequent words. Words with frequencies greater than a detected threshold are removed.

Figures 2, 3:
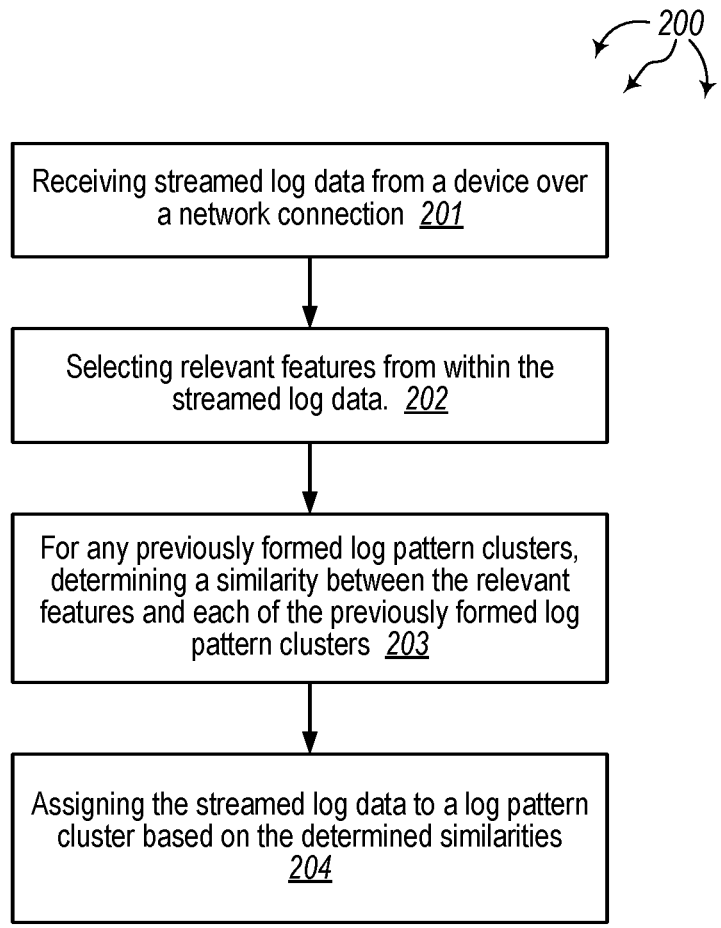
FIG. 2 illustrates a flow chart of an example method for assigning streamed data to a cluster.
FIG. 3 illustrates an example equation for threshold of frequent words in streamed data.

Turning to FIG. 3, equation 300 can be used calculate a threshold for frequent words. In equation 300:

Bi: the number of unique words that go into bucket i

Bi-Bi-1: the calculated rate of change for words categorized into different (adjacent) buckets. Get the minimum number of words difference between buckets. For example, if bucket 4 to bucket 5 is the smallest difference, then use the fourth bucket (frequency==6) as the threshold to define words as frequent words.

In general, similarity calculator 106 is configured to calculate the similarity between streamed data relevant features from currently streamed data and cluster relevant features from other representative streamed data previously assigned to clusters. For example, each cluster 108 can include representative streamed data selected from among the streamed data previously assigned to the cluster 108. The representative streamed data can be represented with cluster relevant features. Similarity calculator 106 can compare relevant features received from feature selector 103 to cluster relevant features for each of clusters 108. Cluster relevant features can be selected in a manner similar to streamed data relevant features.

Cluster labeler 107 is configured to summarize clustered streamed data (e.g., clustered error logs). According to the number of streamed data (e.g., error logs) grouped into the cluster, cluster labeler 107 determines whether to update the cluster label in the future or not (i.e., a cluster label can eventually settle to a steady state). Additionally, cluster labeler 107 can generate cluster labels elastically based on users' configuration.

Clusters 108 includes clusters 108A, 108B, 108C, etc. Each of clusters 108A, 108B, 108C, etc. can be clusters previously formulated from streamed data. Each of clusters 108A, 108B, 108C, etc. can include one or more streamed data. For example, cluster 108A can be formulated from one streamed data and subsequently another streamed data can be added to cluster 108A (e.g., in accordance with example method 200)

FIG. 2 illustrates a flow chart of an example method 200 for assigning streamed data to a cluster. Method 200 will be described with respect to the components and data of computer architecture 100.

Method 200 includes receiving streamed log data from a device over a network connection (201). For example, computer system 101 can receive streamed data 111 (or batch data). Streamed data 111 can originate at another computer system or device. The other computer system or device can send streamed data 111 to computer system 101 over a network connection. Streamed data 111 (or batch data) can represent an error log, a failure log, monitored system data, etc.

Pre-processor 102 can pre-process streamed data 111 (or batch data) to formulate anonymized streamed data 112 (or anonymized batch data). Pre-processing streamed data 111 (batch data) can include removing any customer and request related information. Pre-processor 102 can send anonymized streamed data 112 (or anonymized batch data) to feature selector 103.

Method 200 includes selecting relevant features from within the streamed log data (202). For example, feature selector 103 can receive anonymized streamed data 112 (or anonymized batch data) from pre-processor 102. Feature selector 103 can select relevant features 113 from anonymized streamed data 112 (or from anonymized batch data). Relevant features 113 can be relevant to a condition (e.g., error, failure, monitored event, etc.) at the computer system or device where streamed data 111 originated.

In one aspect, to select relevant features 113, feature selector 103 tokenizes anonymized streamed data 112 (or anonymized batch data) into a plurality of words. For each word in the plurality of words, feature selector 103 calculates a frequency of occurrence of the word within the plurality of words. Based on the calculated frequencies, feature selector 103 determines a sub-plurality of more unique words from among the plurality of words that form each relevant feature 113. For example, feature selector 103 can ignore words that both: include less than a specified number of characters and have a frequency of occurrence above a specified threshold.

Feature selector 103 sends relevant features 113 to clustering unit 104. Clustering unit 104 receives relevant features 113 from feature selector 103. Clustering unit 104 can also access user configuration 114.

Method 200 includes for any previously formed log pattern clusters, determining a similarity between the relevant features and each of the previously formed log pattern clusters (203). For example, similarity calculator 106 can determine a similarity each of relevant features 113 and each of clusters 108A, 108B, 108C, etc. A similarity can be a measure based on a Jaccard similarity index to calculate the distance between relevant features 113 and the contents of a cluster 108. Euclidean distances, cosine distances, or other distances can also be used to measure similarity.

In one aspect, similarity calculator 106 compares words in relevant features 113 to words in cluster relevant features for each of clusters 108A, 108B, 108C, etc. to calculate a similarity or similarity score for relevant features 113. The similarly or similarity score is compared to a similarity threshold to determine candidate clusters to receive anonymized streamed data 112. The similarity threshold can be stored in user configuration 114.

If a similarity or similarity score satisfies a similarity threshold for a cluster, then the cluster is a candidate to receive the streamed data. For example, if words in relevant features 113 are sufficiently similar to words in cluster relevant features for cluster 108C, then cluster 108C is a candidate to receive anonymized streamed data 112. If the similarity or similarity score does not satisfy a similarity threshold, then the cluster is not a candidate to receive the streamed data. For example, if words in relevant features 113 are not sufficiently similar to words in cluster relevant features for clusters 108A and 108B, then clusters 108A and 108B are not candidates to receive anonymized streamed data 112.

Method 200 includes assigning the streamed log data to a log pattern cluster based on the determined similarities (204). For example, clustering unit 104 can assign anonymized streamed data 112 to a cluster in clusters 108 based on determined similarities between relevant features 113 and each of the clusters in clusters 108. When multiple similarities or similarity scores satisfy the similarity threshold, clustering unit 104 can assign anonymized streamed data 112 to the (candidate) cluster with the highest similarity or similarity score to relevant features 113. For example, clustering unit 104 can assign anonymized streamed data 112 to cluster 108C.

When no similarities or similarity scores satisfy the similarity threshold, clustering unit 104 can formulate a new cluster and assign anonymized streamed data 112 to the new cluster. For example, clustering unit 104 can formulate new cluster 108D and assign anonymized streamed data 112 to new cluster 108D.

Clusters 108A, 108B, 108C, and 108D include corresponding labels 109A, 109B, 109C, and 109D respectively. Cluster labeler 107 can generate and/or update labels 109A, 109B, 109C, and 109D based on the contents of streamed data assigned to clusters 108A, 108B, 108C, and 108D respectively. For each cluster 108, the corresponding label can be a summarization extracted from the contents of the cluster. Thus, each label 109 can be used to summarize causes for the generation of the streamed data contained in a corresponding cluster 108. For a new cluster, the label can be summarized from the contents of the first streamed data assigned to the cluster.

For error log data, a label can be used to summarize the root cause of errors contained in a cluster.

Labels can be updated as additional streamed data is assigned to a cluster.

According to the number of streamed data (e.g., error logs) grouped into a cluster 108, cluster labeler 107 determines whether or not to update the corresponding cluster label 109 in the future. When a sufficient amount of streamed data has been assigned to a cluster, it is unlikely that words from additional streamed data would appreciably change the label for the cluster (thus, a cluster label can eventually settle to a steady state). Cluster labeler 107 can generate cluster labels 109 elastically based on user configuration 114.

Figure 4:
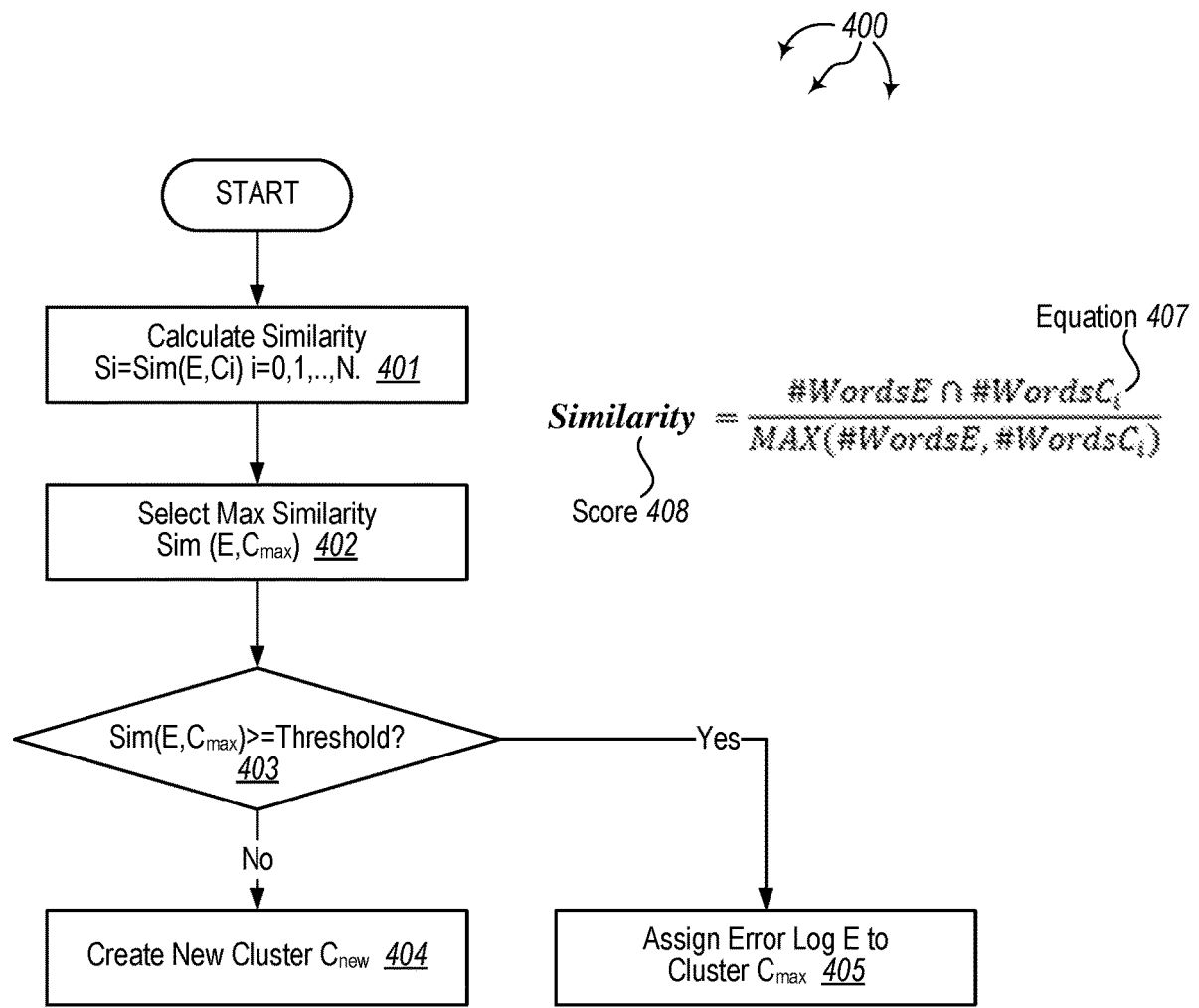
FIG. 4 illustrates a flow chart of an example method for clustering streamed data.

Turning to FIG. 4, FIG. 4 illustrates a flow chart of an example method 400 for clustering streamed data (e.g., an error log). Example method 400 can be implemented at clustering unit 400 to cluster streamed data into clusters 108. In one aspect, method 400 is used to implement 203 and 204 from method 200.

Method 400 includes calculating similarities between anonymized streamed data (e.g., an error log E) and 0 to N previously formed log pattern clusters (e.g., C1, C2, ..., CN) by calculating a similarity score 408 in accordance with equation 407 (401). Similarity score 408 is equal to the quotient of the intersection of words in the streamed data and words in a cluster divided by the greater of the number of words in streamed data or the number of words in the cluster.

Method 400 includes selecting the cluster (e.g., from among C1, C2, ..., CN) with the highest similarity score 408 (i.e., the cluster Cmax with the greatest similarity to the anonymized streamed data) (402). Method 400 includes determining if the highest similarity score is higher than a threshold similarity (403). If the highest similarity score is not higher than the threshold similarity (NO at 403), method 400 includes determining that the anonymized streamed data is not similar enough to be assigned to Cmax. A new cluster Cnew is created and the anonymized streamed data is used as the representative streamed data for Cnew (e.g., for label creation) (404). The anonymized streamed data is assigned to Cnew. If the highest similarity score is higher than the threshold similarity (YES at 403), method 400 includes assigning the anonymized streamed data to the cluster Cmax (405).

When multiple clusters have the same similarly score, the anonymized streamed data can be assigned to each of the multiple clusters or additional rules (e.g., based on one or more of: cluster age, cluster size, customer, request etc.) can be applied to assign the anonymized streamed data to one of the multiple clusters. In one aspect, when multiple clusters have the same similarity score, anonymized streamed data is assigned to a cluster (form among the multiple clusters) to which the highest number of streamed data was previously assigned.

Figure 5:
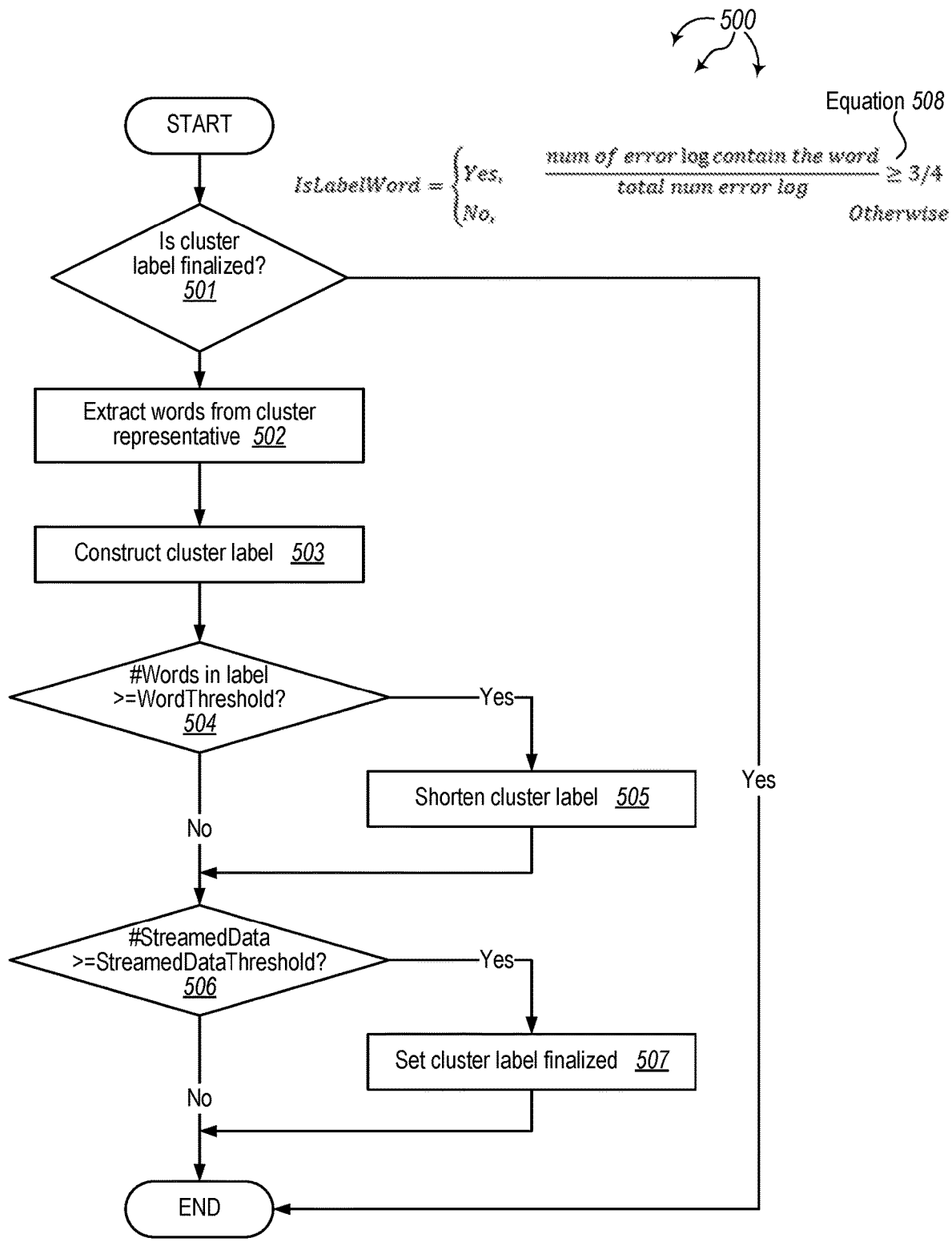
FIG. 5 illustrates a flow chart of an example method for extracting a cluster label for a cluster.

Turning to FIG. 5, FIG. 5 illustrates a flow chart of an example method 500 for extracting a cluster label for a cluster. Method 500 can be implemented at cluster labeler 107 to generate and/or update labels 109A, 109B, 109C, 109D, etc.

Method 500 includes checking if a cluster label has been finalized (501). If the cluster label is finalized (has reached a steady state) (YES at 501), method 500 ends. If the cluster label is not finalized (NO at 501), method 500 includes words are extracted from the cluster (502). That is, the contents of the cluster is tokenized. In some aspects, a cluster has specified representative streamed data that is used for cluster label creation.

Method 500 includes constructing a cluster label from previously extracted (tokenized) words that can be included in the cluster label (503). For each extracted word, Equation 508 can be used to determine if the extracted word can be included in a cluster label for the cluster. For each extracted word, the quotient of the number of error logs containing the word in the cluster divided by the total number of error logs in the cluster is calculated. If the quotient is greater than or equal to ¾ths (0.75), the word can be included in the cluster label. If the quotient is less than ¾ths (0.75), the word is not included in the cluster label.

Values other than ¾ths can be used to loosen (e.g., ½ (0.5), etc.) or tighten (e.g., 0.8, 0.9, etc.) constraints for inclusion of words in the cluster label.

Method 500 includes determining if the number of words in the constructed cluster label is greater than or equal to a word threshold (504). If the number of words in the constructed cluster label is greater than or equal to the word threshold (YES at 504), method 500 includes shortening the constructed cluster label (505). A word threshold (or label length) can be included in user configuration 114.

A cluster label can be shortened based at least in part on how much information a user (e.g., engineer) can consume. If the number of words in the constructed cluster label is less than the word threshold (NO at 504), method 500 includes determining if the number of streamed data in the cluster is greater than or equal to a streamed data threshold (506). That is, is the number of streamed data (e.g., error details) assigned to the cluster large enough to finalize the cluster label. A streamed data (e.g., error) threshold can be included in user configuration 114.

If the number of streamed data in the cluster is greater than or equal to the streamed data threshold (YES at 506), method 500 includes setting the cluster label to finalized (507). If the number of streamed data in the cluster is less than the streamed data threshold (NO at 506), method 500 ends. That is, if the number of streamed data (e.g., error logs) assigned to a cluster is relatively small, the cluster label is likely not generic enough to summarize the pattern of all streamed data (e.g., error logs) assigned to the cluster. As such, further refinement of the cluster label may be appropriate.

Method 500 can be repeated for a cluster from time to time on a per cluster basis and/or when new streamed data is assigned to the cluster.

Aspects of the invention described in FIGS. 1-5 are also applicable to batch data. In one aspect, both streamed data and batch data are clustered and labeled.

Aspects of the invention can be used to cluster log data generated during a cloud based deployment. A customer can enter a Virtual Machine (VM) deployment command that flows from the customer to a Resource Manager, from the resource manager to one or more Resource Providers (e.g., compute, network, storage), from a Compute Resource Provider (CRP) to a fabric controller from the fabric controller to a server rack, from the server rack to one or more individual servers. Resources at the one or more servers can be allocated to deploy a VM in accordance with the VM deployment command Notifications related to the VM deployment can be returned along the same paths back to the customer.

A variety of log based data, including publisher errors, platform errors, and user errors, can be generated as the command flows through different components and as return notifications flow back to the customer. The variety of log based information can be clustered in accordance with the described aspects of the invention.

Aspects of the invention can be used to cluster and label streamed data and/or batch data from cloud providers, publishers, content distributors (e.g., bot frameworks), and other network-based platforms. Aspects of the invention can also be used in Internet of Things (IoT) environments where a variety of devices are streaming data to a central hub. The hub can utilize the described clustering and labeling mechanisms to group and summarize the streamed into a form that is more human understandable. Aspects of the invention can also be used in serverless architectures with Just In time (JIT) resource allocation to cluster and label streamed data and/or batch data.

Accordingly, aspects of the invention utilize a dynamic clustering and labeling system for information, failures, and error logs such that the system can learn from previously identified patterns and use that information to group newer information dynamically as it gets generated. Domain knowledge can be leveraged for preprocessing. A measure based on a similarity index can be used to calculate the distance between (e.g., error) logs.

Based on users' configuration of a similarity threshold, logs can be automatically assigned into groups. Inside each logs group, summarization can be applied to extract a label for each cluster to de-identify individual customer/request related information for protecting privacy. Dynamic clustering and labeling can be used for (e.g., larger scale) cloud systems for detecting top error clusters/patterns, providing Engineering teams ability to more quickly identify patterns and ship resolutions. Aspects of the invention can be used by cloud providers, content distributors, and other network-based entities to cluster and label (e.g., error) logs.

In some aspects, a computer system comprises one or more hardware processors and system memory. The system memory is coupled to the one or more hardware processors. The system memory stores instructions that are executable by the one or more hardware processors. The one or more hardware processors execute the instructions stored in the system memory to cluster streamed data (or batch data).

The one or more hardware processors execute the instructions to receive streamed log data from a device over a network connection. The one or more hardware processors execute the instructions to select relevant features within the streamed log data. The one or more hardware processors execute the instructions to, for any previously formed log pattern clusters, determine a similarity between the relevant features and each of the previously formed log pattern clusters. The one or more hardware processors execute the instructions to assign the streamed log data to a log pattern cluster based on the determined similarities.

In one aspect, the one or more hardware processors execute the instructions stored in the system memory to pre-process the streamed log data to remove any customer and request related information prior to selecting relevant features within the streamed log data.

In another aspect, the one or more hardware processors executing the instructions stored in the system memory to select relevant features within the streamed log data includes the one or more hardware processors executing the instructions stored in the system memory to tokenize the streamed log data into a plurality of words, for each word in the plurality of words, calculate a frequency of occurrence of the word within the plurality of words, and based on the calculated frequencies, determine a sub-plurality of more unique words from among the plurality of words that form a relevant feature.

In a further aspect, the one or more hardware processors executing the instructions stored in the system memory to determine a sub-plurality of more unique words from among the plurality of words that form a relevant feature includes the one or more hardware processors executing the instructions stored in the system memory to ignore words that both: include less than a specified number of characters and have a frequency of occurrence above a specified threshold.

In an additional aspect, the one or more hardware processors executing the instructions stored in the system memory to determine a similarity between the relevant features and each of the previously formed log pattern clusters includes the one or more hardware processors executing the instructions stored in the system memory to, for each of a plurality of previously formed log pattern clusters: calculate a similarity between the relevant features and the previously formed log pattern cluster and determine if the calculated similarity satisfies a similarity threshold.

In another further aspect, the one or more hardware processors execute the instructions stored in the system memory to access the similarity threshold from user configuration.

In another additional aspect, the one or more hardware processors execute the instructions stored in the system memory to from among any previously formed log pattern clusters having calculated similarities satisfying the similarity threshold, select a previously formed log pattern cluster having the highest calculated similarity to the relevant features. The one or more hardware processors executing the instructions stored in the system memory to assign the streamed log data to a log pattern cluster based on the determined similarities includes the one or more hardware processors executing the instructions stored in the system memory to assign the streamed log data to the previously formed log pattern cluster having the highest calculated similarity to the relevant features.

In an additional further aspect, the one or more hardware processors executing the instructions stored in the system memory to assign the streamed log data to a log pattern cluster based on the determined similarities includes the one or more hardware processors executing the instructions stored in the system memory to assign the streamed log data to a previously formed log pattern cluster.

In another aspect, the one or more hardware processors execute the instructions stored in the system memory to alter a label for the previously formed log pattern cluster based on words contained in the relevant features.

In a further other aspect, the one or more hardware processors executing the instructions stored in the system memory to assign the streamed log data to a log pattern cluster based on the determined similarities includes the one or more hardware processors executing the instructions stored in the system memory to create a new log pattern cluster based on the relevant features and assign the streamed log data to the new log pattern cluster.

In a further additional aspect, the one or more hardware processors executing the instructions stored in the system memory to determine a similarity between the relevant features and each of the previously formed log pattern clusters includes the one or more hardware processors executing the instructions stored in the system memory to, for each of the previously formed log pattern clusters: calculate a similarity between the relevant features and the previously formed log pattern cluster and determine that the calculated similarity does not satisfy a similarity threshold.

In a further aspect, the one or more hardware processors execute the instructions stored in the system memory to access a label length from user configuration and construct a label for the new log pattern cluster by summarizing words contained in the relevant features in accordance with the label length.

In an additional aspect, the one or more hardware processors executing the instructions stored in the system memory to receive streamed log data from a device over a network connection includes the one or more hardware processors executing the instructions stored in the system memory to receive streamed log data from a Virtual Machine (VM).

Computer implemented methods for performing the executed instructions to automatically cluster streamed data (or batch data) are also contemplated. Computer program products storing the instructions, that when executed by a processor, cause a computer system to cluster streamed data (or batch data) are also contemplated.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A computer system, comprising:
   one or more hardware processors;
   system memory coupled to the one or more hardware processors, the system memory storing instructions that are executable by the one or more hardware processors;
   the one or more hardware processors executing the instructions stored in the system memory to:
      receive streamed log data over a network connection;
      pre-process the streamed log data to remove any customer and request related information;
      filter words that include less than a specified number of characters and that have a frequency of occurrence above a specified threshold to select relevant features from within the streamed log data, wherein the relevant features are relevant to a monitored event at a device where the streamed log data originated;
      for one or more previously formed log pattern clusters, determine a similarity between the relevant features and the one or more previously formed log pattern clusters; and
      assign the streamed log data to a log pattern cluster based on the determined similarity.

2. The computer system of claim of claim 1, wherein the one or more hardware processors executing the instructions stored in the system memory to receive streamed log data over the network connection comprises the one or more hardware processors executing the instructions stored in the system memory to receive streamed error log data from the device;
   wherein the one or more hardware processors executing the instructions stored in the system memory to select relevant features from within the streamed log data comprises the one or more hardware processors executing the instructions stored in the system memory to select an error pattern from within the streamed error log data;
   wherein the one or more hardware processors executing the instructions stored in the system memory to determine a similarity between the relevant features and the one or more previously formed log pattern clusters comprises the one or more hardware processors executing the instructions stored in the system memory to determine a similarity between the error pattern and the one or more previously formed log pattern clusters; and
   wherein the one or more hardware processors executing the instructions stored in the system memory to assign the streamed log data to the log pattern cluster based on the determined similarities comprises the one or more hardware processors executing the instructions stored in the system memory to assign the error pattern to the log pattern cluster based on the determined similarities.

3. The computer system of claim 1, wherein the one or more hardware processors executing the instructions stored in the system memory to select relevant features from within the streamed log data comprise the one or more hardware processors executing the instructions stored in the system memory to:
   tokenize the streamed log data into a plurality of words;
   for one or more words in the plurality of words, calculate the frequency of occurrence of the word within the plurality of words; and
   based on the calculated frequencies, determine a sub-plurality of more unique words from among the plurality of words that form a relevant feature.

4. The computer system of claim 1, wherein the one or more hardware processors executing the instructions stored in the system memory to determine a similarity between the relevant features and the one or more previously formed log pattern clusters comprises the one or more hardware processors executing the instructions stored in the system memory to:
   calculate a similarity between the relevant features and the one or more previously formed log pattern clusters; and
   determine if the calculated similarity satisfies a similarity threshold.

5. The computer system of claim 4, further comprising the one or more hardware processors executing the instructions stored in the system memory to access the similarity threshold from user configuration.

6. The computer system of claim 4, further comprising the one or more hardware processors executing the instructions stored in the system memory to, from among any previously formed log pattern clusters having calculated similarities satisfying the similarity threshold, select a previously formed log pattern cluster having a highest calculated similarity to the relevant features; and wherein the one or more hardware processors executing the instructions stored in the system memory to assign the streamed log data to the log pattern cluster based on the determined similarities comprise the one or more hardware processors executing the instructions stored in the system memory to assign the streamed log data to a previously formed log pattern cluster having the highest calculated similarity to the relevant features.

7. The computer system of claim 1, wherein the one or more hardware processors executing the instructions stored in the system memory to assign the streamed log data to the log pattern cluster based on the determined similarities comprise the one or more hardware processors executing the instructions stored in the system memory to assign the streamed log data to a previously formed log pattern cluster.

8. The computer system of claim 7, further comprising the one or more hardware processors executing the instructions stored in the system memory to alter a label for the previously formed log pattern cluster based on words contained in the relevant features.

9. The computer system of claim 1, wherein the one or more hardware processors executing the instructions stored in the system memory to assign the streamed log data to the log pattern cluster based on the determined similarities comprise the one or more hardware processors executing the instructions stored in the system memory to:
  create a new log pattern cluster based on the relevant features; and
  assign the streamed log data to the new log pattern cluster.

10. The computer system of claim 9, wherein the one or more hardware processors executing the instructions stored in the system memory to determine a similarity between the relevant features and the one or more previously formed log pattern clusters comprise the one or more hardware processors executing the instructions stored in the system memory to:
  calculate a similarity between the relevant features and the one or more previously formed log pattern clusters; and
  determine that the calculated similarity does not satisfy a similarity threshold.

11. The computer system of claim 9, further comprising the one or more hardware processors executing the instructions stored in the system memory to:
  access a label length from user configuration; and
  construct a label for the new log pattern cluster by summarizing words contained in the relevant features in accordance with the label length.

12. The computer system of claim 1, wherein the one or more hardware processors executing the instructions stored in the system memory to receive the streamed log data over the network connection comprises the one or more hardware processors executing the instructions stored in the system memory to receive the streamed log data from a Virtual Machine.

13. A method for use at a computer system, the method for clustering streamed data, the method comprising:
  receiving streamed log data from the computer system over a network connection;
  pre-processing the streamed log data to remove any customer and request related information;
  filtering words that include less than a specified number of characters and that have a frequency of occurrence above a specified threshold to select relevant features from within the streamed log data, wherein the relevant features are relevant to a monitored event at the computer system;
  determining a similarity between the relevant features and a first previously formed log pattern cluster;
  determining a similarity between the relevant features and a second previously formed log pattern cluster; and
  automatically assigning the streamed log data to a log pattern cluster based on the determined similarities between the relevant features, the first previously formed log pattern cluster, and the second previously formed log pattern cluster.

14. The method of claim 13, wherein selecting the relevant features from within the streamed log data comprises:
  tokenizing the streamed log data into a plurality of words;
  for one or more words in the plurality of words, calculating a frequency of occurrence of the word within the plurality of words; and
  based on the calculated frequencies, determining a sub-plurality of more unique words from among the plurality of words that form the relevant feature, including ignoring words that both: include less than a specified number of characters and have a frequency of occurrence above the specified threshold.

15. The method of claim 13, wherein:
determining the similarity between the relevant features and the first previously formed log pattern cluster comprises:
  calculating a similarity between the relevant features and the first previously formed log pattern cluster;
  accessing a similarly threshold from user configuration; and
  determining if the calculated similarity satisfies the similarity threshold;
the method further comprises, from among any other previously formed log pattern clusters having calculated similarities satisfying the similarity threshold, selecting a previously formed log pattern cluster having a highest calculated similarity to the relevant features; and
assigning the streamed log data to the log pattern cluster based on the determined similarities comprises assigning the streamed log data to the previously formed log pattern cluster having the highest calculated similarity to the relevant features.

16. The method of claim 13, wherein assigning the streamed log data to the log pattern cluster based on the determined similarities comprises assigning the streamed log data to the first previously formed log pattern cluster; and
  further comprising altering a label for the first previously formed log pattern cluster based on words contained in the relevant features.

17. The method of claim 13, wherein determining the similarity between the relevant features and the first previously formed log pattern cluster comprises:
  calculating a similarity between the relevant features and the first previously formed log pattern cluster; and
  determining that the calculated similarity does not satisfy a similarity threshold;
  wherein assigning the streamed log data to the log pattern cluster based on the determined similarities comprises:
    creating a new log pattern cluster representative of the relevant features based on determining that the calculated similarity does not satisfy a similarity threshold for both the first and the second previously formed log pattern cluster; and
    assigning the streamed data to the new log pattern cluster.

18. A computer program product for use at a computer system, the computer program product for implementing a method for clustering streamed data, the computer program product comprises one or more computer storage devices having stored thereon computer-executable instructions that, when executed at a processor, cause the computer system to:
- receive streamed error log data from a device over a network connection;
- pre-process the streamed error log data to remove any customer and request related information;
- filter words that include less than a specified number of characters and that have a frequency of occurrence above a specified threshold to select relevant features from within the streamed error log data, wherein the relevant features are relevant to a monitored event at the device;
- for each of a plurality of previously formed error log pattern clusters, determine a similarity between the relevant features and the previously formed error log pattern clusters; and
- assign the streamed log data to an error log pattern cluster based on the determined similarities.

\* \* \* \* \*